(12) United States Patent
Chakrabarti (10) Patent No.: US 11,790,092 B1
(45) Date of Patent: Oct. 17, 2023

(54) CRYPTOPROCESSOR ACCESS MANAGEMENT

(71) Applicant: Amazon Technologies, Inc., Seattle, WA (US)

(72) Inventor: Somesh Chakrabarti, Herndon, VA (US)

(73) Assignee: Amazon Technologies, Inc., Seattle, WA (US)

( * ) Notice: Subject to any disclaimer, the term of this patent is extended or adjusted under 35 U.S.C. 154(b) by 177 days.

(21) Appl. No.: 16/883,702

(22) Filed: May 26, 2020

(51) Int. Cl.
*H04L 29/06* (2006.01)
*G06F 21/60* (2013.01)

(52) U.S. Cl.
CPC .......... *G06F 21/604* (2013.01); *G06F 21/602* (2013.01)

(58) Field of Classification Search
CPC .............................. G06F 21/604; G06F 21/602
See application file for complete search history.

(56) References Cited

U.S. PATENT DOCUMENTS

| | | | | |
|---|---|---|---|---|
| 8,296,320 B1* | 10/2012 | Corbett | ................... | H04L 63/10 707/786 |
| 9,172,532 B1* | 10/2015 | Fuller | ................... | H04L 9/0822 |
| 9,552,485 B1* | 1/2017 | Cignetti | ................ | H04L 9/3263 |
| 10,592,068 B1* | 3/2020 | Sedky | ....................... | G06F 9/50 |
| 2002/0078348 A1* | 6/2002 | Leung | ................... | G06F 21/602 713/189 |
| 2003/0046576 A1* | 3/2003 | High, Jr. | ................. | H04L 63/20 726/1 |
| 2005/0262572 A1* | 11/2005 | Yoneyama | ............ | H04L 63/102 713/189 |
| 2007/0011736 A1* | 1/2007 | Kalibjian | ................ | G06F 21/52 726/14 |
| 2007/0223332 A1* | 9/2007 | Fujinami | .............. | H04N 9/8042 386/E5.064 |
| 2009/0222882 A1* | 9/2009 | Kabat | ................... | G06F 21/604 726/1 |
| 2013/0212707 A1* | 8/2013 | Donahue | ............. | G06F 21/6218 726/29 |
| 2014/0229729 A1* | 8/2014 | Roth | ..................... | G06F 21/602 713/153 |
| 2019/0207915 A1* | 7/2019 | Schaap | ................. | H04L 9/0891 |

FOREIGN PATENT DOCUMENTS

WO    WO-2013053393 A1 *   4/2013   ......... H04L 63/0428

* cited by examiner

*Primary Examiner* — Vance M Little
(74) *Attorney, Agent, or Firm* — Davis Wright Tremaine LLP (57) ABSTRACT

Disclosed techniques provide a permission framework to control access to operations performed by cryptoprocessor. The techniques can identify a permission policy linked to a cryptographic operation. The permission policy can include data identifying the cryptographic operation and data identifying permission information for the cryptographic operation. The permission policy can be evaluated to determine whether to allow or deny execution of the cryptographic operation.

26 Claims, 5 Drawing Sheets

CRYPTOPROCESSOR ACCESS MANAGEMENT

BACKGROUND

Cryptographic authentication and processing of data are important parts of modern data security. As computing requirements and data volumes increase over time, the technical requirements of ensuring the security thereof also increase. Various types of cryptoprocessors exist for managing and processing cryptographic information, such as hardware security modules (HSMs), trusted platform modules (TPMs), and smart cards. These cryptoprocessors are capable of processing data and attendant cryptographic operations. Allowing customers of an online service provider to securely access cryptoprocessors to prevent unauthorized access to their data is a challenging endeavor due to the complexities involved. For example, in a cloud computing environment, it can be difficult to introduce and maintain control over customer access and use of operations provided by cryptoprocessors. Generally, providers of distributed computer systems spend significant effort and computing resources to ensure customers have controlled and trouble-free access to operations performed by cryptoprocessors.

BRIEF DESCRIPTION OF THE DRAWINGS

Various techniques will be described with reference to the drawings, in which.

DETAILED DESCRIPTION

The present disclosure describes a variety of techniques for managing use of and access to operations performed by a cryptoprocessor. A policy framework is provided to control the use of the operations that can be performed by the cryptoprocessor. The policy framework can include policies that are created to control use of the operations that can be performed by the cryptoprocessor. The policies can be assigned universally to the cryptoprocessor and thereby apply to all users of the cryptoprocessor. Alternatively, policies can be assigned to specific users or groups of users of the cryptoprocessor. Therefore, using the disclosed techniques, cryptoprocessor administrators can control the use of operations, such as cryptographic operations, through a combination of comprehensive policies affecting at least a majority of users accessing a cryptoprocessor and specific policies affecting individual users of the cryptoprocessor.

Global and user specific policies for managing use of and access to cryptographic operations performed by a cryptoprocessor can be designed using a unique string. In this disclosure, the unique string is referred to a cryptoprocessor resource name (CRN) or a hardware security module (HSM) resource name (HRN). The CRN or HRN provides a structured syntax. The structured syntax can include several segmented sections. For example, the several segmented sections can be separated by a colon or another character or series of characters used to separate the segmented sections.

The structured syntax of the CRN or HRN can include a variety of entries in a defined format. In one example, the structured syntax has the following format: hrn:providerservice:vendorregion:cluster-id:resource-type/resource-id, where hrn (or crn) is a constant string indicating that the syntax is an HRN (or CRN); provider is a provider, such as an online service provider, hosting or providing a cryptoprocessor service; service is the name of the cryptoprocessor service, such as a service offered by the provider; vendor is the manufacturer of a cryptoprocessor; region is the geographical region or other predefined region in which the cryptoprocessor is operating; cluster-id is the identifier of a cryptoprocessor cluster that comprises the cryptoprocessor, for example cluster-xxxxxx; resource-type is the type of resource being stored in the cryptoprocessor, such as a value or identifier for a certificate, data, private-key, public-key, secret-key, crypto-user, crypto-admin, and the like; and resource-id is a unique integer handle for the resource. In general, the resource-type can be a cryptographic material (e.g., certificate, cryptographic data, private-key, public-key, secret-key, and crypto-user) stored by the cryptoprocessor, or a user, such as an administrator of the cryptoprocessor, known to the cryptoprocessor. An example HRN is given by: hrn: online_provider_name:online_hsm_name:cyrptoprocessor_manufacturer:us-east-1: cluster-kzlczlspnho:secret-key/123456.

A policy for managing use or access to operations performed by a cryptoprocessor can include at least one statement that incorporates at least one structured syntax. The statement can include action, resource and effect components. Each of the action, resource, and effect components can include a structured syntax, CRN, or HRN. Multiple statements can be included in a single policy.

The action component of the statement can indicate a cryptographic operation that the statement affects. For example, the action component may include a structured syntax that identifies a type of cryptoprocessor (e.g., HSM) in one section of the syntax and a cryptographic operation supported by the cryptoprocessor in another section of the syntax. The cryptographic operation identified in the action component may indicate an operation related to a cryptographic key, such as generate, create, copy, encrypt, decrypt, sign, verify, derive, get-attribute, set-attribute, or list attributes. Alternatively, the cryptographic operation identified in the action component may indicate an operation related to management of the cryptoprocessor, such as create user, delete user, list user, or change password.

The resource component of the statement can identify the cryptographic resource to which the statement in the policy applies. For example, the resource component can include a CRN or HRN. The CRN or HRN can be parsed by a computing device from left to right. Specifically, a resource identified by the CRN or HRN is identified with increasing specificity as the computing device parses the CRN or HRN from left to right.

The effect component of the statement can include an indicator specifying if the cryptographic operation of the action component is allowed or denied. The indicator can be "allow" or "deny". An indicator of "allow" permits the cryptoprocessor to execute the cryptographic operation identified in the action component. An indicator of "deny" prevents the cryptoprocessor from executing the cryptographic operation identified in the action component.

A policy with at least one statement can be assigned to a user of a cryptoprocessor. Also, such a policy can be assigned to a cryptoprocessor or a collection of cryptoprocessors. The policy can control which cryptographic operations can be invoked by a user. When applied to a cryptoprocessor or collection of cryptoprocessors, the policy may control which cryptographic operations may be invoked by all users of the cryptoprocessor or a collection of cryptoprocessor in the cluster.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including some or all of the following: (1) ensuring users have proper access to cryptographic operations and the cryptoprocessors that provide those cryptographic operations, thereby improving efficiencies associated with the use of cryptoprocessors; (2) reducing expenditure of computing resources previously required to mitigate unauthorized use of cryptoprocessors; (3) reducing security risks and the requisite use of computer resources stemming from unauthorized use of cryptoprocessors; (4) consistently enhancing the security, function, and operation of cryptoprocessors by regularly and dynamically deploying policies dictating access to the cryptoprocessors; and so forth.

Figure 1:
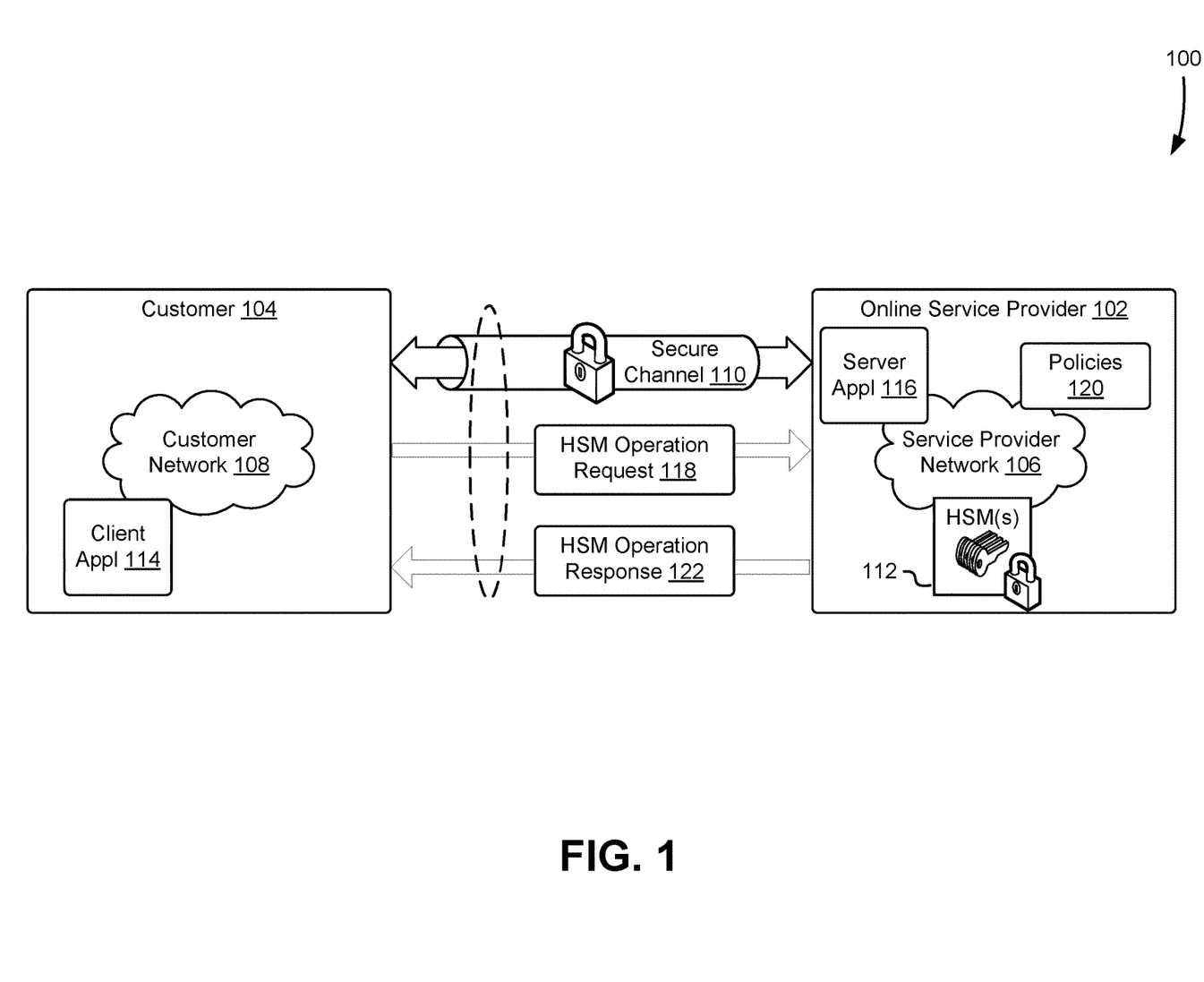
FIG. 1 shows an illustrative example of an environment in which various embodiments of the present disclosure can be practiced.

FIG. 1 shows an illustrative example of an environment 100 in which various embodiments of the present disclosure can be practiced. In this example, the environment 100 includes a computer-implemented online service provider 102 and a customer 104 of the service provider 102. The service provider 102 can be an organization that hosts various computing resources on behalf of one or more customers, such as the customer 104. For illustrative purposes, the service provider 102 and the customer 104 can each be referred to herein as one or more computing devices comprising storage and processing technology.

The service provider 102 can operate one or more facilities that are used to host various computing hardware resources, such as hardware servers, data storage devices, network devices, other devices discussed herein and other equipment, such as server racks, networking cables, and the like. The computing resource hardware can utilize its computing hardware resources to operate one or more services. Such services can include services that enable customers of the service provider 102 to remotely manage computing resources to support the customers' operations while reducing or even eliminating the need of the customers to invest in physical equipment. Example services include, but are not limited to, various data storage services (object-based data storage services, archival data storage services, database services and the like), program execution services and other services. The services can be used by customers to support a wide variety of activities, such as operating a website, operating enterprise systems supporting an organization, distributed computation and/or other activities.

The service provider 102 can use its computing hardware resources to provide customers with use of cryptoprocessors, such as one or more hardware security modules (HSMs) 112 as a service. For example, there can be a cluster of HSMs accessible by the customer 104 as a service provided by the service provider 102. An HSM is a hardware device (e.g., hardware appliance) that is dedicated to protect information (e.g., cryptographic keys) from unauthorized disclosure and to perform operations using the protected information. An HSM can be implemented in a variety of ways, such as a plug-in card (configured to plug into circuitry of a computing device) or an external TCP/IP security device that can be connected to a computing device or can be accessible over a network. In accordance with the foregoing, the HSM 112 can be single HSM or a cluster of HSMs.

An HSM can store cryptographic keys that are used by the HSM to perform one or more types of cryptographic operation, such as encryption, decryption, or electronic signature generation. An HSM can utilize one or more secure cryptoprocessor chips to prevent tampering and bus probing. In addition, an HSM can be configured to comply with one or more security standards. In some examples, HSMs are configured to comply with one or more of the National Institute of Standards and Technology's (NIST's) Federal Information Processing Standards (FIPS), such as at least one security level (e.g., level 1, level 2, level 3, or level 4) of FIPS.

It should be noted that, while the present disclosure uses HSMs when providing illustrative examples, the techniques of the present disclosure are also applicable to security modules and cryptoprocessors (also referred to as "cryptoprocessor modules"), and related cryptoprocessor libraries, in general. For example, the techniques disclosed herein may be used with TPMs, computing devices that safeguards cryptographic keys by storing the cryptographic keys within a tamper-resistant physical device, or virtual HSMs. In addition, while many security modules (e.g., HSMs) utilize specialized cryptoprocessors and/or other hardware, one or more of the disclosed techniques can be used with cryptoprocessor libraries for security modules implemented using software. Moreover, a cryptoprocessor module can be produced to be compliant with one or more levels of FIPS using commodity hardware and/or appropriately configured software instead specialty hardware often found in commercial HSMs.

In the environment 100 illustrated in FIG. 1, the service provider 102 hosts a service provider network 106 on behalf of the customer 104. The network 106 can be a network of computing devices managed by the customer 104 and offered as a service by the service provider 102. The network 106 can be a virtual network implemented by a physical network of devices of the service provider 102, which can also implement virtual devices and/or virtual networks for other customers of the service provider 102. Suitable service provider hosted customer networks are often referred to as virtual private clouds (VPCs).

The network 106 can be definable, configurable and/or otherwise manageable by the customer 104 via appropriately configured application programming interface (API) calls to the service provider 102. The network 106 can be, for example, configured by the customer 104 to have a virtual network topology that closely resembles a traditional network that the customer 104 might operate in its own datacenter or other physical location. The service provider 102 can also implement multiple such networks 106 that are isolated from one another. For example, the network 106 associated with the customer 104 can be implemented so that the devices in the network 106 are not communicatively or otherwise accessible to other customers of the service provider 102 without the customer 104 having configured the network to allow such access.

The customer 104 can configure the network 106 in various ways. The customer 104 can, for example, assign IP addresses to computing devices from the customer's own IP address range (instead of using IP addresses assigned by the service provider 102), create one or more subnets, configure routing tables, configure network gateways and/or otherwise configure the network 106. In instances where the customer 104 assigns IP addresses from its own IP address space, the service provider 102 can utilize network address translation (NAT) techniques to manage network traffic among the various devices hosted by the service provider 102. For instance, the service provider 102 can wrap packets addressed to IP addresses of the customer 104 in packets addressed to IP addresses managed by the service provider 102 for transmission among the various devices managed by the service provider 102. Upon delivery to a customer computing device having an IP address addressed from the customer IP space, the service provider 102 can unwrap the packets.

The customer 104 can maintain a customer network 108. The network 108 can be a network (physical, virtual, or combination of physical and virtual) hosted using the customer's 104 own hardware. As illustrated in FIG. 1, the customer network 108 and the service provider network 106 communicate with one another over a secure channel 110, such as a transport layer security (TLS) negotiated connection or a direct connection, although other mechanisms for secure communication can be used. The TLS connection can be established through a handshaking process between the customer's 104 and the service provider's 102 computing devices that involves asymmetric and symmetric encryption. In some examples, the secure channel 110 is a virtual private network (VPN) connection using an appropriate security protocol, such as TLS. The secure channel 110 can be understood to effectively extend the customer's 104 customer network 108 to the service provider network 106 as if the resources of networks 106 and 108 were co-located using hardware resources of a single facility. Requests, data, and messages by computing devices of the customer 104 and the customer network 108 can be communicated over the secure channel 110. Similarly, responses, data, messages, and other communications of computing devices of the service provider 102 and the provider network 106 can be communicated over the service channel 110.

The customer 104 can communicate with the HSM 112, via the secure channel 110, using a client application 114 or other computing resource directly coupled to the HSM 112. In some implementations, communicating with the HSM 112 is facilitated by a server application 116 that is hosted by the service provider network 106. The server application 116 can have access to a library of the HSM 112. In some implementations, the server application 116 is integrated with the HSM 112, such as within the physical enclosure of the HSM 112. In some implementations, the server application 116 can be associated with the HSM 112 through a device driver that facilitates communication between the server application 116 and the HSM 112. The library can contain functions and associated computer-executable instructions that when executed cause the HSM 112 to perform cryptographic functions. For example, the computer-executable instructions associated with functions of the library can cause the HSM 112 to encrypt, decrypt, or sign data, generate keys, unwrap or wrap keys, and so forth. In some implementations, the library can be stored in a storage of the service provider network 106. The server application 106 can offer the library for download by the client application 114 of the customer 104. In this disclosure, it is to be understood that functions set forth in a library can include underlying computer-executable instructions.

In some implementations, the library hosted by the service provider 102 can be obtained by the customer 104. For example, the client application 114 can obtain the library. In some implementations, the client application 114 downloads the library from the service provider 102. In some implementations, the customer 104 obtains the library when the client application 114 is obtained from the service provider 102. For example, the library can be packaged with the client application 114 library files. In some implementations, other applications, hardware, or software of the customer 104 can obtain the library hosted by the online service provider 102.

The library can be a public key cryptography standards (PKCS) library module that implements a PKCS standard, such as PKCS #11 (v1.0-v3.0) or #12. The PKCS library can translate calls from an API to calls specific to an HSM, such as the HSM 112. In some implementations, the API is a PKCS API, such as the PKCS #11 API Cryptoki provided by RSA® Security. In other examples, the library can be a Java cryptography extension (JCE), OpenSSL, wolfSSL, or other standard related cryptography library. The client application 114 can implement the API to call cryptographic computer-executable instructions associated with functions in the library. In some implementations, the client application 114 obtains the API from the service provider 102. The API can be obtained when the client application 114 is obtained by the customer 104, or the API can be obtained when the library is obtained by the customer 104, or the API can be obtained by the customer 104 separately from the client application 114 or the library.

In some implementations, the library includes a cryptoprocessor library that comprises API accessible PKCS #11 functions, such as a set of cryptoprocessor functions including: C_CreateObject, C_Decrypt, C_DecryptFinal, C_DecryptInit, C_DecryptUpdate, C_DestroyObject, C_DigestInit, C_Digest, C_Encrypt, C_EncryptFinal, C_EncryptInit, C_EncryptUpdate, C_FindObjects, C_FindObjectsFinal, C_FindObjectsInit, C_Finalize, C_GenerateKey, C_GenerateKeyPair, C_GenerateRandom, C_GetAttributeValue, C_GetFunctionList, C_GetInfo, C_GetMechanismInfo, C_GetMechanismList, C_GetOperationState, C_GetSessionInfo, C_GetSlotInfo, C_GetSlotList, C_GetTokenInfo, C_Initialize, C_Login, C_Logout, C_OpenSession, C_Sign, C_SignFinal, C_SignInit, C_SignRecover, C_SignRecoverinit, C_SignUpdate, C_UnWrapKey, C_Verify, C_VerifyFinal, C_VerifyInit, C_VerifyRecover, C_VerifyRecoverinit, C_VerifyUpdate, and/or C_WrapKey. As described, each of the functions can comprise underlying computer-executable instructions to invoke operations of a cryptoprocessor.

In some implementations, the customer 104, via the client application 114, can initiate a cryptoprocessor function supported by the library installed on the computer resources of the customer 104. The computer-executable instructions associated with the function can be obtained by the service provider 102. Specifically, the server application 116 can receive the computer-executable instructions associated with the function call over the secure channel 110, where the function is called by the client application 114. In some implementations, the function is called by an API of the client application 114. The function call may be part of a request 118. The request 118 can include several function calls.

The function call of the request 118 can cause the HSM 112 to perform a cryptographic operation supported by the HSM 112. However, the function call of the request 118 can be authorized by the online service provider 102 before the cryptographic operation supported by the HSM 112 is executed. For example, the online service provider 102, via the server application 106 or the HSM 112, can evaluate the cryptographic operation identified in the function call associated with the request 118 to determine if one or more policies 120 are linked to the cryptographic operation identified in the function call. As described in the preceding, use of and access to cryptographic operations supported by the HSM 112 may be controlled by one or more policies 120. The policies 120 can be stored within one or more computing devices of the online service provider 102. Alternatively, the policies 120 can be stored in one or more of the HSMs 112. The policies 120 can apply specifically to operations of a single HSM associated with the HSMs 112 or operations of a plurality of HSMs 112. The plurality of HSMs 112 may be a cluster of HSMs. Some of the policies 120 may apply to all users or a collection of users that make function calls associated with operations provided by at least one of the HSMs 112. In other implementations, some of the policies 120 may be linked to a specific user that has access to at least one of the HSMs 112.

Evaluation of the policies 120 can be performed by the HSM 112. In the case of a cluster of HSMs 112, the policies 120 can be evaluated by one or more of the HSMs 112 on behalf of other HSMs 112 in the cluster. In some implementations, functionality for evaluating the policies 112 is part of firmware of the HSM 112. In some implementations, evaluation of the policies 120 can be performed by the server application 116 or other functionality of the provider 102.

A response 122 can be conveyed to the customer 104 based on the request 118. The response 122 can include a confirmation that the function call of the request 118 was processed by the HSM 112. Furthermore, the response 122 may include one or more items, such as encrypted data, generated by the HSM 112 based on execution of at least one cryptographic operation linked to the function call of the request 118. The confirmation that the function call of the request 118 was processed by the HSM 112 can be generated by the provider 102, via the server application 116 or the HSM 112, in response to evaluating a policy 120 linked to the customer 104 or the HSM 112. Specifically, when the policy 120 specifies that the cryptographic operation linked to the function call of the request 118 is permitted or allowed, the confirmation can be generated and incorporated with the response 122 conveyed to the customer 104. Alternatively, when the policy 120 specifies that the cryptographic operation linked to the function call of the request 118 is impermissible or denied, the response 122 may convey the denial to the customer 104.

Figure 2:
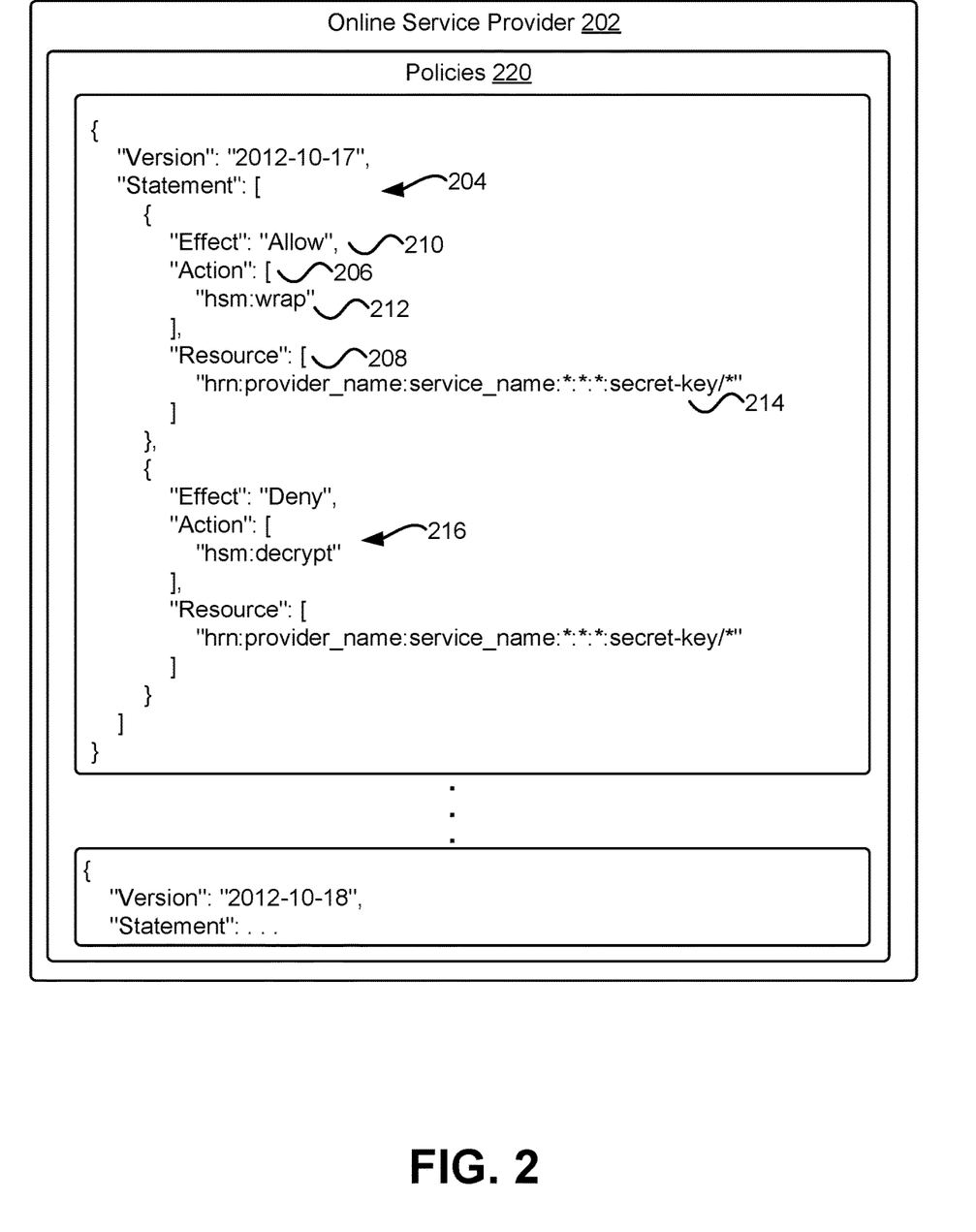
FIG. 2 illustrates cryptoprocessor policies that can be stored by an online service provider.

FIG. 2 illustrates policies 220 stored by an online service provider 202. The online service provider 202 may be similar or the same as the online service provider 102. Similarly, the policies 220 stored by the online service provider 202 can also be stored by the online service provider 102. In general, the policies 220 control access and use of cryptoprocessor operations. The policies 220 may be assigned to individual users of the service provider 202, a set of users, and/or one or more cryptoprocessors. Cryptoprocessor operations may be performed by cryptoprocessor, such as one or more of the HSMs 112. The policies 220 may be stored in a computing device hosted by the online service provider 202. In some implementations, the policies 220 may be stored in one or more HSMs 112 implemented by the online service provider 202. The policies 220 may be assessed by the online service provider 202. In some implementations, the policies 220 are assessed by one or more of the HSMs 112.

Each policy included in the set of policies 220 includes at least one statement 204. In general, each policy included in the set of policies 220 includes data in the statement 204. The data may include various identifiers and structured syntax entries linked to components of the statement 204. The statement 204, in some implementations, includes an action component 206, a resource component 208, and an effect component 210. The action component 206 can identify an operation, such as a cryptographic operation, that can be executed by the HSM 112. In the illustrated example, the action component 206 identifies the wrap operation that can be performed by the HSM 112. However, as should be appreciated, the action component 206 can identify any operation capable of being performed by a cryptoprocessor.

In some implementations, the operation identified by the action component 206 is part of a structured syntax 212. The structured syntax 212, in this example, includes multiple sections divided by colons. The sections of the structured syntax 212 may be divided by other characters/symbols or a series of characters/symbols. In the illustrated example, a first portion of the structured syntax 212 includes data identifying that the cryptoprocessor is an HSM and the second portion of the structured syntax 212 includes data identifying the cryptographic operation (i.e., wrap).

The resource component 208 of the policy 220 includes a CRN or an HRN. In this example, the resource component 208 includes HRN 214 comprised in a structured syntax. For example, the HRN 214 can include a variety of entries in a defined format. As previously described, in one example, the structured syntax has the following format: hrn:providerservice:vendorregion:cluster-id:resource-type/resource-id, where hrn (or crn) is a constant string indicating that the syntax is an HRN (or CRN); provider is a provider, such as an online service provider, hosting or providing a cryptoprocessor service; service is the name of the cryptoprocessor service; vendor is the manufacturer of a cryptoprocessor; region is the geographical region or other predefined region in which the cryptoprocessor is operating; cluster-id is the identifier of a cryptoprocessor cluster that comprises the cryptoprocessor, for example cluster-xxxxxx; resource-type is the type of resource being stored in the cryptoprocessor, such as a value or identifier for a certificate, data, private-key, public-key, secret-key, crypto-user, crypto-admin, and the like; and resource-id is a unique integer handle for the resource.

The example HRN 214 in FIG. 2 comprises: hrn:provider_name:service_name:*:*:*:secret-key/*. The asterisks in the HRN 214 represent wildcard entries. For example, the HRN 214 includes wildcard entries for the region, cluster-id, and resource-id portions of the HRN 214. Therefore, the HRN 214 pertains to all regions, all cryptoprocessor clusters, all cryptoprocessor manufacturers, and all secret keys stored by an HSM or cluster of HSMs provided by a named provider and service included in the HRN 214. In some implementations, the HRN 214 may comprises additional or fewer sections in the structured syntax than those illustrated and described with reference FIG. 2. Wildcard entries can be used in any section of an HRN.

The effect component 210 can include an indicator specifying if the cryptographic operation of the action component 206 is allowed or denied. The indicator can be "allow" or "deny". Other indicators can be used to specify if the cryptographic operation of the action component 206 is allowed or denied. An indicator of "allow" permits the HSM 112 to execute the cryptographic operation identified in the action component 206. An indicator of "deny" prevents the HSM 112 from executing the cryptographic operation identified in the action section.

As is shown in FIG. 2, the statement 204 includes an additional component set 216 including action, resource, and effect components. In this example, the action, resource, and effect components of the additional component set 216 pertain to the cryptographic operation decrypt. As shown in the effect component, the cryptographic operation decrypt is not permitted or is denied. Thus, users and/or an HSM linked to this policy are not permitted to execute the cryptographic operation decrypt for all secret key(s) identified by the resource component.

Figure 3:
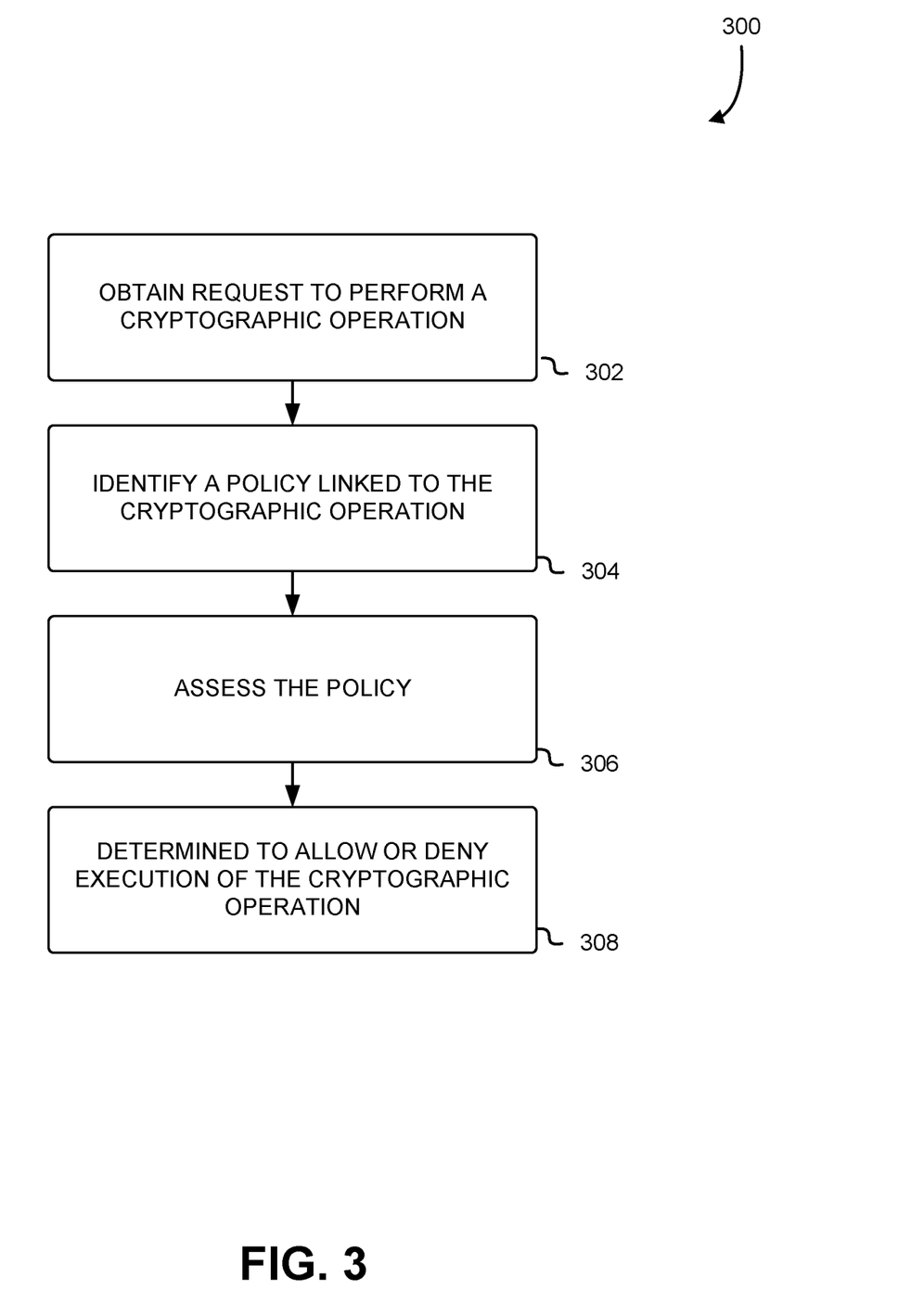
FIG. 3 illustrates a flow diagram including various processing acts, implemented by a system environment with one or more computing devices, related to use of cryptoprocessor policies that can dictate access and use of operations performed by a cryptoprocessor.

FIG. 3 illustrates a flow diagram 300 including various processing acts, implemented by a system environment with one or more computing devices, related to use of cryptoprocessor policies that can control access and use of operations performed by a cryptoprocessor. In some implementations, the acts of the flow diagram 300 are executed by one or more computing devices illustrated in FIGS. 1-2 and 5. The illustrated computing devices can execute computer-executable instructions incorporating at least some of the processing acts of the flow diagram 300 to provide and allow for use of one or more policies that dictate access and use of the cryptoprocessor operations provided by one or more cryptoprocessors.

The particular implementation of the technologies disclosed herein is a matter of choice dependent on the performance and other requirements of the computing device. Accordingly, the logical operations, also referred to as acts, described herein are referred to variously as states, operations, structural devices, acts, or modules. These states, operations, structural devices, acts and modules can be implemented in hardware, software, firmware, in special-purpose digital logic, and any combination thereof. It should be appreciated that more or fewer operations can be performed than shown in the figures and described herein. These operations can also be performed in a different order than those described herein. It should also be understood that the methods described herein can be ended at any time and need not be performed in their entireties.

Some or all operations of the methods described herein, and/or substantially equivalent operations, can be performed by execution of computer-readable instructions included on a computer-storage media. The term "computer-readable instructions," and variants thereof, as used in the description and claims, is used expansively herein to include routines, applications, application modules, program modules, system modules, programs, components, data structures, algorithms, and the like. Computer-readable instructions can be implemented on various system configurations, including single-processor or multiprocessor systems, minicomputers, mainframe computers, distributed computer systems, personal computers, hand-held computing devices, microprocessor-based, programmable consumer electronics, combinations thereof, and the like.

Thus, it should be appreciated that the logical operations described herein are implemented (1) as a sequence of computer-implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules might be implemented in software, in firmware, in special purpose digital logic, and any combination thereof.

At 302, a request to perform a cryptographic operation is obtained. For example, the online service provider 102 or 202 may receive a request to perform a cryptographic operation. The request may be generated by a customer, such as the customer 104. In some implementations, the request is generated by via an API using the client application 104. In some implementations, the request includes a function call to invoke a cryptoprocessor to execute a cryptoprocessor operation linked to the function call. In some implementations, the cryptoprocessor is an HSM, such as the HSM 112.

At 304, a policy linked to the cryptographic operation associated with the request is identified. In some implementations, the policy linked to the cryptographic operation is assigned to one or more HSMs. In some implementations, the policy is linked to a user or a group of users having access to the one or more HSMs. The policy can be stored by the online service provider 102 or 202. In some implementations, the policy can be stored by the online service provider 102 or 202 in a collection or set of policies that control the use and access to operations performed by the one or more HSMs. In some implementations, the identified policy includes at least one statement including an action component, a resource component, and an effect component. The action component may identify the cryptographic operation associated with the request at 302. The resource component can identify a cryptographic resource of the cryptoprocessor. The cryptographic resource can be a cryptographic item, such as a cryptographic key. The effect component of the policy may indicate a permission for the cryptographic operation identified by the action component.

At 306, the policy identified at 304 is assessed. In some implementations, the policy is assessed by the service provider 102 or 202. In some implementations, the policy is assessed by a cryptoprocessor. The cryptoprocessor to perform the assessment of the policy can be the same cryptoprocessor storing the cryptographic resource identified by the resource component. In some implementations, the cryptoprocessor to perform the assessment of the policy can be a cryptoprocessor in a cluster of cryptoprocessors that function cohesively in a group. In some implementations, assessing the policy identified at 304 comprises processing at least one statement included in the policy identified at 304. The processing may include parsing the components of the statement to identify permission data linked to a cryptographic operation identified by the policy. Furthermore, the processing may include parsing the components of the statement to identify the resource component that is linked to the permission data and the cryptographic operation identified in the policy.

At 308, the cryptographic operation identified in the request at 302 is allowed or denied based on the assessing performed at 306. When the cryptographic operation is allowed, the cryptographic operation is performed by the cryptoprocessor. When the cryptographic operation is denied, the cryptographic operation is not performed by the cryptoprocessor. A response can be communicated to the customer 104. The response can include data identifying that the cryptographic operation was allowed or denied. The response may be generated by the service provider 102 or 202. In some implementations, the response may be generated by the cryptoprocessor.

Figure 4:
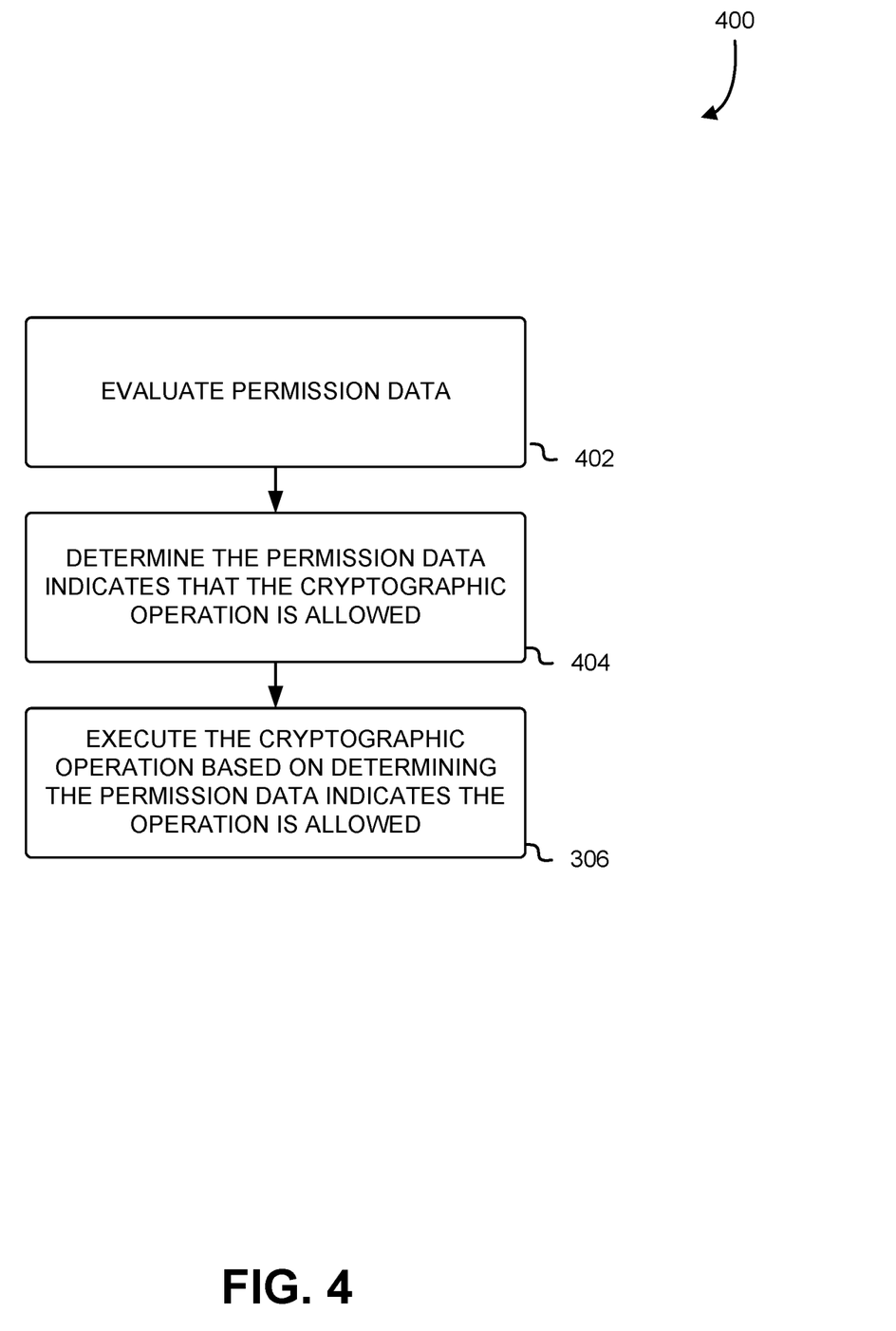
FIG. 4 illustrates another flow diagram including various processing acts, implemented by a system environment with one or more computing devices, related to use of cryptoprocessor policies that can dictate access and use of operations performed by a cryptoprocessor.

FIG. 4 illustrates a flow diagram 400 including various processing acts, implemented by a system environment with one or more computing devices, related to use of cryptoprocessor policies that can control access and use of operations performed by a cryptoprocessor. In some implementations, the acts of the flow diagram 400 are executed by one or more computing devices illustrated in FIGS. 1-2 and 5. The illustrated computing devices can execute computer-executable instructions incorporating at least some of the processing acts of the flow diagram 400 to provide and allow for use of one or more policies that dictate access and use of the cryptoprocessor operations provided by one or more cryptoprocessors.

At 402, permission data for a cryptographic operation is evaluated. In some implementations, the permission data may be contained in a policy. The policy can be linked to a cryptographic operation and assigned to a cryptoprocessor, such as one or more HSMs. In some implementations, the policy is linked to a user or a group of users having access to the one or more HSMs. The policy can be stored by the online service provider 102 or 202. In some implementations, the policy can be stored by the online service provider 102 or 202 in a collection or set of policies that control the use and access to operations performed by the one or more HSMs. In some implementations, the policy includes at least one statement including an action component, a resource component, and an effect component. The action component may identify the cryptographic operation. The resource component can identify a cryptographic resource of the cryptoprocessor. The cryptographic resource can be a cryptographic item, such as a cryptographic key. The effect component of the policy may indicate a permission for the cryptographic operation identified by the action component.

At 404, it is determined that the cryptographic operation is allowed. Determining that the cryptographic operation is allowed can be based on evaluation of the permission data performed at 402. In some implementations, the online service provider 102 or 202 determines the cryptographic operation is allowed. In some implementations, the cryptoprocessor associated with the permission data determines the cryptographic operation is allowed.

At 406, the cryptographic operation is executed by the cryptoprocessor. In some implementations, the cryptographic operation is executed in response to determining, by the cryptoprocessor, that the cryptographic operation is allowed.

Figure 5:
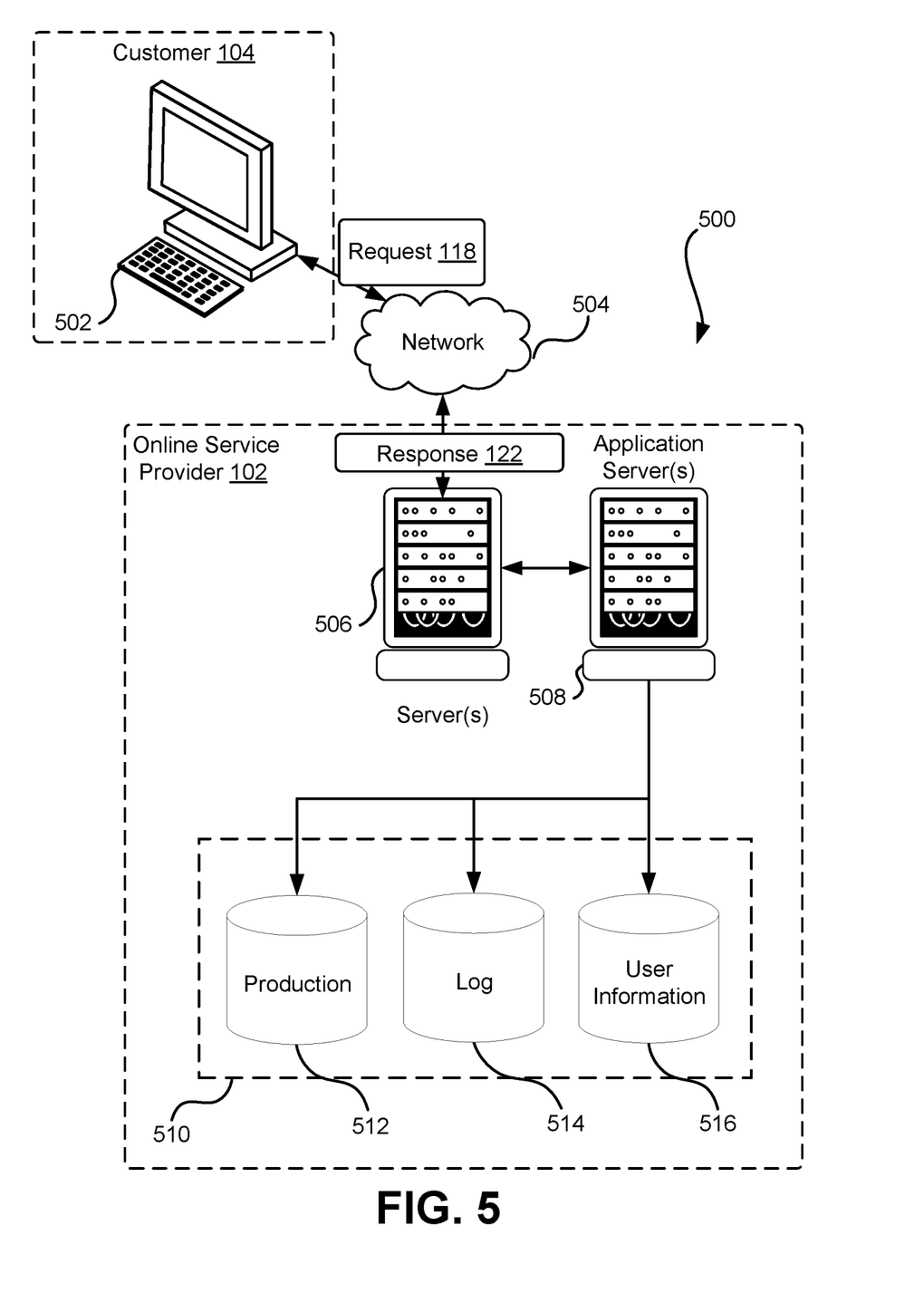
FIG. 5 illustrates a system in which various embodiments can be implemented.

FIG. 5 illustrates aspects of an example system 500 for implementing aspects in accordance with an embodiment. In some implementations, as illustrated, the example system 500 may implement some or all of the computing resources of the system environment 100. As will be appreciated, although a web-based system is used for purposes of explanation, different systems may be used, as appropriate, to implement various embodiments. In an embodiment, the system includes an electronic client device 502, which includes any appropriate device operable to send and/or receive requests, messages, or information over an appropriate network 504 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 506 for receiving requests and serving content in response thereto, although for other networks an alternative device serving a similar purpose could be used as would be apparent to one of ordinary skill in the art.

In an embodiment, the illustrative system includes at least one application server 508 and a data store 510, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 502 and the application server 508, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 510, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 512 and user information 516, which are used to serve content for the production side. The data store also is shown to include a mechanism for storing log data 514, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 510.

The data store 510, in an embodiment, is operable, through logic associated therewith, to receive instructions from the application server 508 and obtain, update or otherwise process data in response thereto, and the application server 508 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 502. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 500 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 500, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 5. Thus, the depiction of the system 500 in FIG. 5 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C #or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

In various embodiments described throughout this disclosure, computing resources are configured to perform tasks (e.g., generate data, process data, store data, route messages, transmit data, submit requests, process requests) by loading computer-readable executable instructions into memory that, as a result of execution by one or more processors, cause the one or more processors to execute instructions to perform tasks. In at least one embodiment, a computer system is configured to perform a task through a software application that controls the execution of specific commands, requests, tasks, jobs, and more. A computer system may be configured to execute computer-readable instructions encoded in a software application by loading executable code of the software application into memory and using one or more processors of the computer system to run the executable instructions.

The specification and drawings are, accordingly, to be regarded in an illustrative rather than a restrictive sense. It will, however, be evident that various modifications and changes may be made thereunto without departing from the broader spirit and scope of the subject matter set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the subject matter recited by the claims to the specific form or forms disclosed but, on the contrary, the intention is to cover all modifications, alternative constructions, and equivalents falling within the spirit and scope of this disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C,"

(i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate various embodiments and does not pose a limitation on the scope of the claims unless otherwise claimed. No language in the specification should be construed as indicating any non-claimed element as essential to the practice of inventive subject material disclosed herein.

Embodiments of this disclosure are described herein, including the best mode known to the inventors for carrying out inventive concepts described herein. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method, comprising:
    obtaining a request, by a hardware security module (HSM), to perform a cryptographic operation, the request identifying the cryptographic operation;
    identifying a policy linked to the cryptographic operation, the policy comprising at least one statement including:
        an action component identifying, in first sectionized data, the cryptographic operation,
        a resource component identifying, in second sectionized data, a cryptographic resource stored by the HSM, and
        an effect component indicating a permission for the cryptographic operation;
    assessing, by the HSM, the policy linked to the cryptographic operation;
    generating, by the HSM, a determination to allow or deny execution of the cryptographic operation based on the assessing of the effect component of the policy linked to the cryptographic operation; and
    processing, by the HSM, the request according to the determination.

2. The computer-implemented method according to claim 1, wherein the effect component includes permission data identifying an allow permission or a deny permission.

3. The computer-implemented method according to claim 1, wherein the request to perform the cryptographic operation is based on an application programming interface (API) call including computer-executable instructions to cause the HSM to perform the cryptographic operation, the API call including at least data identifying the cryptographic operation, wherein the cryptographic operation is supported by the HSM.

4. The computer-implemented method according to claim 1, wherein the cryptographic resource identified the resource component is a cryptographic material held by the HSM, and wherein the second sectionized data includes a section identifying the cryptographic material held by the HSM.

5. The computer-implemented method according to claim 1, wherein identifying the policy linked to the cryptographic operation comprises locating the policy in at least one HSM that stores the policy.

6. The computer-implemented method according to claim 1, wherein a predetermined symbol separates data portions in the first sectionized data associated with the action component and the predetermined symbol separates data portions in the second sectionized data associated with the resource component.

7. A system, comprising:
one or more processors; and
memory that stores computer-executable instructions that are executable by the one or more processors to cause the system to:
identify a permission policy assigned to a cryptographic operation, the permission policy comprised in a collection of permission policies, the permission policy comprising:
sectionized data identifying a cryptoprocessor and the cryptographic operation;
data identifying permission information for the cryptographic operation, the data identifying permission information for the cryptographic operation comprising a permission indicator of a plurality of predetermined permission indicators, and
a plurality of separated components, a first of the plurality of separated components comprising the sectionized data and a second of the plurality of separated components comprising the permission indicator;
evaluate the permission policy assigned to the cryptographic operation; and
determine to allow or deny execution of the cryptographic operation based on evaluating the permission policy.

8. The system of claim 7, wherein a third of the plurality of separated components comprises another sectionized data with data identifying a resource of the cryptoprocessor.

9. The system of claim 7, wherein the permission policy comprises an action component and an effect component, the action component including the sectionized data identifying the cryptographic operation and the effect component including the data identifying the permission information.

10. The system of claim 7, wherein the permission policy identifies an entity providing services related to the cryptoprocessor, a manufacturer of the cryptoprocessor, and a resource stored in the cryptoprocessor.

11. The system of claim 10, wherein the resource identified by the permission policy is a cryptographic resource of the cryptoprocessor.

12. The system of claim 7, wherein the cryptoprocessor is a hardware security module (HSM) and the permission policy is established by a service provider that maintains the HSM on behalf of users of the service provider.

13. The system of claim 7, wherein evaluating the permission policy, in the cryptoprocessor, comprises analyzing the data identifying permission information to determine that the permission indicator comprises an allow indicator or a deny indicator, when the permission indicator comprises the allow indicator, the cryptoprocessor performs the cryptographic operation, and when the permission indicator comprises the deny indicator, the cryptoprocessor declines to perform the cryptographic operation.

14. The system of claim 7, wherein identifying the permission policy assigned to the cryptographic operation comprises determining the permission policy is stored in at least one cyptoprocessor.

15. The system of claim 7, wherein evaluating the permission policy includes executing logic of the cyptoprocessor provided to process the data identifying the cryptographic operation and the data identifying the permission information for the cryptographic operation.

16. The system of claim 7, wherein the sectionized data comprises data portions separated by a predetermined symbol.

17. A non-transitory computer-readable storage medium storing thereon executable instructions that, as a result of being executed by one or more processors of a computer system, cause the computer system to:
evaluate, in a cryptoprocessor, permission data for a cryptographic operation executable by the cryptoprocessor, the permission data comprising a user configurable statement comprising:
first sectionized data including at least a constant string identifying a type of structured syntax and data identifying at least a resource of the cryptoprocessor, and
second sectionized data identifying at least the cryptographic operation,
wherein each of the first sectionized data and the second sectionized data is comprised in a separate component section of the user configurable statement; and
based on the evaluation performed in the cryptoprocessor, determine the permission data indicates that the cryptographic operation executable by the cryptoprocessor is allowed.

18. The non-transitory computer-readable storage medium of claim 17, wherein the executable instructions that cause the computer system to evaluate, in the cryptoprocessor, the permission data comprise instructions to evaluate a permission policy comprising the permission data.

19. The non-transitory computer-readable storage medium of claim 17, wherein the executable instructions further comprise executable instructions that, as a result of being executed by the one or more processors, cause the computer system to identify the first sectionized data, the first sectionized data including a plurality of entries comprising at least a first entry including data identifying a manufacturer of the cryptoprocessor and a second entry including data identifying the resource of the cryptoprocessor.

20. The non-transitory computer-readable storage medium of claim 19, wherein the resource of the cryptoprocessor is a cryptographic material.

21. The non-transitory computer-readable storage medium of claim 17, wherein the cryptoprocessor is a hardware security module (HSM).

22. The non-transitory computer-readable storage medium of claim 17, wherein the executable instructions further comprise executable instructions that, as a result of being executed by the one or more processors, cause the computer system to obtain an application programming interface (API) call including computer-executable instructions to cause the cryptoprocessor to perform the cryptographic operation, the API call including at least data identifying the cryptographic operation, wherein the cryptographic operation is supported by the cryptoprocessor.

23. The non-transitory computer-readable storage medium of claim 17, wherein the executable instructions that cause the computer system to evaluate, in the cryptoprocessor, the permission data comprise instructions to evaluate a permission policy comprising an action component and an effect component, the action component including data identifying the cryptographic operation and the effect component including the permission data.

24. The non-transitory computer-readable storage medium of claim 17, wherein the executable instructions that cause the computer system to determine, in the cryptoprocessor, the permission data indicates that the cryptographic operation executable by the cryptoprocessor is allowed comprises analyzing the permission data to identify an allow indicator or a deny indicator in the permission data, when the permission data comprises the allow indicator, the cryptoprocessor performs the cryptographic operation, and when the permission data comprises the deny indicator, the cryptoprocessor declines to perform the cryptographic operation.

25. The non-transitory computer-readable storage medium of claim 17, wherein evaluating the permission data comprises using logic of the cyptoprocessor to process the permission data.

26. The non-transitory computer-readable storage medium of claim 17, wherein a predetermined symbol separates the first portion of the permission data from the second portion of the permission data.

\* \* \* \* \*